United States Patent [19]

Hagarty

[11] 3,856,896

[45] Dec. 24, 1974

[54] ALKYL PROPARGYL PHOSPHONATES

[75] Inventor: John D. Hagarty, Sturtevant, Wis.

[73] Assignee: S. C. Johnson & Son, Inc., Racine, Wis.

[22] Filed: Feb. 9, 1973

[21] Appl. No.: 331,165

[52] U.S. Cl.............. 260/956, 260/957, 260/973, 424/219
[51] Int. Cl............................ A01n 9/36, C07f 9/40
[58] Field of Search............................ 260/956, 957

[56] References Cited
UNITED STATES PATENTS

| | | | |
|---|---|---|---|
| 3,065,125 | 11/1962 | Newallis et al. | 260/956 X |
| 3,071,610 | 1/1963 | Senkbeil | 260/956 |
| 3,803,271 | 4/1974 | Chiddix et al. | 260/956 |

OTHER PUBLICATIONS

Montgomery, Def. Pub. of Serial No. 776,247 filed 11–15–68, published in 875 O.G.11 on 6–2–70, Defensive Publication No. T875,002, 260–956.

Primary Examiner—Lorraine A. Weinberger
Assistant Examiner—Richard L. Raymond

[57] ABSTRACT

New alkyl propargyl phosphonates useful as synergists and synergistic insecticidal compositions containing such phosphonates are described.

9 Claims, No Drawings

ALKYL PROPARGYL PHOSPHONATES

This invention relates to novel insecticidal compositions and, in particular, to insecticidal compositions containing a toxicant in combination with certain novel synergists for insecticidal activity.

Current trends in the chemical control of insects call for inherently safer materials with low mammalian toxicity. Accordingly, there is a great demand for broad spectrum insecticides which are suitable for the high volume usage entailed in household, garden and agricultural applications.

Of the several insecticde classes which demonstrate low mammalian toxicity and good biodegradability, pyrethrum, a naturally occurring insecticide mixture has found widest use. Pyrethrin, the most active component of pyrethrum, is a widely used insecticide which has a high order of insecticidal activity and a low mammalian toxicity. Due to the high cost of pyrethrin and its analogous compounds, however, synthetic products have been prepared which have a similar structure and exhibit significant insecticidal activity.

The wide market which pyrethrins and related insecticides enjoy today is due, primarily, to the discovery of certain additives which enhance the activity of these insecticides. These additives, commonly called synergists, are agents which may themselves exhibit insecticidal activity but which, when combined with other insecticides, produce new insecticides having an effectiveness significantly greater than the sum of the effectiveness of the components when used separately. Unfortunately, it has been found that many compounds which are excellent synergists for pyrethrins, are not nearly as effective when used with other insecticides such as the carbamates, for example, etc.

It is an object of this invention to provide novel synergistic compounds. It is a further object of this invention to provide a synergistic insecticidal composition comprising an alkyl propargyl phosphonate as the essential active ingredient.

The novel synergistic alkyl phosphonates which are the subject of this invention have the structural formula:

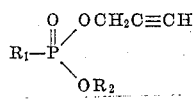

wherein $R_1$ is a straight or branched chain alkyl or alkenyl group having 2–12 carbon atoms and $R_2$ is propargyl, butyl carbityl or a lower alkyl group having 1–5 carbon atoms.

The dipropargyl phosphonates falling within the general formula, i.e. those compounds wherein $R_2$ is propargyl, can be prepared according to the following reaction sequence:

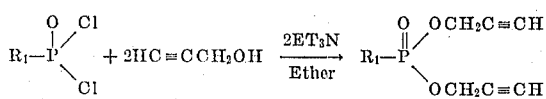

As can be seen from the above reaction sequence, an alkyl phosphonic dichloride is reacted with propargyl alcohol in a suitable solvent in the presence of a base. Generally, basic amines such as triethylamine, for example, are employed as the base. Water immiscible solvents such as diethyl ether, for example, are suitable for the reaction. The reaction is generally carried out at ice bath temperature, although temperatures up to room temperature may be employed. It is preferred to carry out the reaction at a temperature from about 0°–5°C. Water is generally added to remove any amine hydrochloride formed and the dipropargyl phosphonate is obtained in the organic solvent layer. The dipropargyl phosphonate can be purified by distillation after removal of the solvent.

The mixed alkyl propargyl phosphonates can be prepared according to the following reaction sequence:

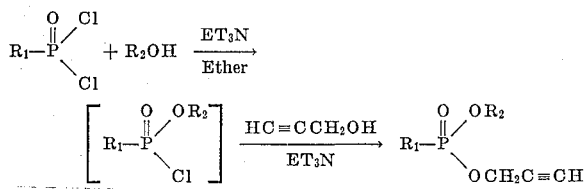

The reaction sequence is similar to that for the preparation of the dipropargyl phosphonates except that only one equivalent each of alcohol and amine are employed followed by the addition of one equivalent of propargyl alcohol and amine. The mixed alkyl phosphonate remains in the organic solvent and can be purified by distillation after removal of the solvent.

The synergistic compositions of this invention may be employed to control a variety of crop pests and household pests. Good results are obtained when these compositions are applied as aerosol sprays, for example, or are formulated into any of the diluted and extended types of formulations commonly used in insecticidal practice, including dusts, wettable powders, emulsifiable concentrates, solutions, granulars, baits, and the like, for application to foliage, within closed areas, to surfaces, and wherever insect control is desired.

The synergistic compositions may be made into liquid concentrates by solution or emulsification in suitable liquids, and into solid concentrates by admixing with talc, clays, and other known solid carriers used in the insecticide art. These concentrates are compositions which normally contain about 10–50 percent of the toxicant with the remainder being inert materials such as dispersing agents, emulsifying agents and wetting agents. Minor amounts of other substances may be added to the compositions in order to obtain particular functional or esthetic effects. Substances such as perfumes, corrosion inhibitors, buffering agents, fillers, flame retardants, antioxidants, ultraviolet radiation absorbers, disinfectants and the like, are examples of such additives. The concentrates are diluted for practical application, with water or other liquids for liquid sprays or with additional solid carrier for application as a dust or granular formulation. Baits are usually prepared by mixing such concentrates with a suitable food, such as a mixture of cornmeal and sugar. The concentration of the toxicant in the diluted formulations, as generally applied for insect control, is normally in the range of about 2 percent to about 0.001 percent. Many variations of spraying and dusting compositions may be used by the addition of the synergistic compounds of this invention to compositions known or apparent in the art.

Because of the extremely low mammalian toxicity of these compositions, they are preferred compositions for use in the control of pests in an environment inhabited by man and animals, including the control of flies, mosquitoes, ants, roaches, and the like.

The relative amounts of synergist and toxicant employed are not critical in that a relatively minor amount of synergist is effective in imparting a beneficial effect to the combination. The synergistic insecticidal compositions of this invention generally contain a ratio of toxicant to alkyl propargyl phosphonate from about 1:1 to about 1:10. The preferred ratio is from about 1:1 to 1:4. Even larger proportions of synergist may be employed without detriment, whether or not the optimum synergistic proportions have been achieved. It is clear that effective amounts of synergist should be employed in the composition, that the components should be present in synergistic proportions, and that effective amounts of the compositions, to control the particular insect pests, should be applied.

Although this invention has been described in detail with particular reference to preferred embodiments thereof, it will be understood that variations and modifications can be effected within the spirit and scope of this invention as described hereinabove and as defined in the appended claims.

EXAMPLE 1

Dipropargyl ethylphosphonate

A solution of 0.5 mole (50 g.) of triethylamine and 0.5 mole (28 g.) of propargyl alcohol in 250 ml. of dry ether is placed in a 500 ml. 3-necked flask equipped with a stirrer and reflux condenser. The resultant mixture is stirred and cooled in an ice bath. Ethyl phosphonic dichloride, 0.25 mole (37.25 g.) in 100 ml. of ether is added dropwise to the solution with stirring. After the addition is complete, the stirring is continued for one hour. The reaction mixture is then allowed to come to room temperature while the stirring is continued. Water, 300 ml., is added and the ether layer is washed three times with 200 ml. of a saturated sodium bicarbonate solution. The ether solution is then dried over magnesium sulfate and the solvent is removed in vacuo. Upon distillation at 0.2 mm., dipropargyl ethylphosphonate is obtained having a b.p. of 90°-93°C.

Following the procedure outlined in Example 1 above, the following compounds are prepared:

EXAMPLE 13 n-Propyl propargyl s-butylphosphonate

A solution of s-butyl phosphonic dichloride, 0.5 mole (87.6 g.) in 150 ml. of ether is placed in a 500 ml. three-necked flask equipped with a stirrer and reflux condenser. The solution is stirred and cooled in ice while a solution of 0.5 mole (50 g.) of triethylamine and 0.5 mole (30 g.) of n-propyl alcohol in 250 ml. of dry ether is added dropwise with stirring to the solution of the dichloride. After the addition is complete, a solution of 0.5 mole (28 g.) of propargyl alcohol and 0.5 mole of triethylamine is added dropwise with stirring. The stirring is continued for one hour after the addition of the alcohol is complete. The mixture is then allowed to come to room temperature while the stirring is continued. Water (150 ml.) is added and the ether layer is separated from the water layer. The ether layer is washed three times with 150 ml. of a saturated sodium bicarbonate solution. The solution is then dried over magnesium sulfate and the solvent is removed in vacuo. Upon distillation of the residue at 0.12 mm., n-propyl propargyl s-butyl-phosphonate is obtained in 77 percent yield having a b.p. of 81°-83°C.

Following the procedure outlined in Example 13 above, the following compounds are prepared:

TABLE II

| Example No. | $R_1$ | Alkyl Propargyl Alkylphosphonates $R_2$ | B.P. | $n25$ | Yield, % |
|---|---|---|---|---|---|
| 14 | s-Bu | i-Bu | 94–95° (0.35 mm) | 1.4474 | 57 |
| 15 | n-Pr | i-Bu | 74–77° (0.1 mm) | 1.4429 | 80 |
| 16 | n-Pr | n-Pr | 83–86° (0.35 mm) | 1.4442 | 60 |
| 17 | n-Pr | butyl carbityl | 151–158 (0.1 mm) | 1.4561 | 52 |

EXAMPLE 18

A synergistic insecticidal composition is prepared by dissolving the alkyl phosphonate (0.5 – 2 percent) and the toxicant (0.5 percent) in acetone. About ½ microliter of the solution is applied to the insects' ventral abdomen. Each test is repeated twice with 25 male German roaches or female houseflies that have been anesthetized with carbon dioxide. Mortality readings are determined 24 hours after the initial treatment. The bioassay results for the synergistic insecticidal compositions are tabulated in Table III.

TABLE I.—DIPROPARGYL PHOSPHONATES

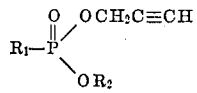

| Example No. | $R_1$ | $R_2$ | B.P. | $n^{25}$ | Yield, percent |
|---|---|---|---|---|---|
| 2 | n-Pr | Propargyl | 93–94° (0.05 mm.) | 1.4625 | 68 |
| 3 | i-Pr | do | 93–95° (0.22 mm.) | 1.4627 | 80 |
| 4 | n-Bu | do | 105–108° (0.1 mm.) | 1.4620 | 52 |
| 5 | s-Bu | do | 98–104° (0.25 mm.) | 1.4641 | 72 |
| 6 | t-Bu | do | 90–93° (0.25 mm.) | 1.4612 | 19 |
| 7 | $C_6H_{11}$ | do | 120–122° (0.25 mm.) | 1.4880 | 67 |
| 8 | $CH_2=CH-CH_2-$ | do | 92–94° (0.1 mm.) | 1.4766 | 52 |
| 9 | $CH_3-CH=CH(CH_3)-$ | do | 118–121° (0.5 mm.) | 1.4797 | 73 |
| 10 | $CH_3(CH_2)_5CH(CH_3)-$ | do | 135–136° (0.7 mm.) | 1.4626 | 40 |
| 11 | $CH_3(CH_2)_6CH(CH_3)-$ | do | 151–156° (0.12 mm.) | 1.4629 | 39 |
| 12 | n-$C_8H_{17}$ | do | 132–133° (0.2 mm.) | 1.4618 | 65 |

TABLE III.—BIOASSAY RESULTS

| | | Pyrethrins | | | | Neopynamin | | | | Bagon | | | |
|---|---|---|---|---|---|---|---|---|---|---|---|---|---|
| R₁ | R₂ | HF | SR | GR | SR | HF | SR | GR | SR | HF | SR | GR | SR |
| n-Pr | Propargyl | .162 | 5.37 | .170 | 2.24 | .091 | 6.04 | .331 | 6.95 | .031 | 16.45 | .112 | 2.77 |
| n-Pr | i-Bu | .235 | 3.70 | .193 | 1.97 | .133 | 4.14 | .557 | 4.13 | .073 | 7.00 | .133 | 2.31 |
| n-Pr | n-Pr | .187 | 4.65 | .150 | 2.53 | .094 | 5.85 | .389 | 5.91 | .035 | 14.57 | .108 | 2.87 |
| s-Bu | Propargyl | .118 | 7.37 | .169 | 2.25 | .059 | 9.32 | .355 | 6.48 | .039 | 13.08 | .151 | 2.05 |
| C₆H₁₁ | do | .235 | 3.70 | .238 | 1.60 | .128 | 4.30 | .681 | 3.38 | .104 | 4.90 | .261 | 1.19 |
| Allyl | do | .332 | 2.62 | .238 | 1.60 | .120 | 4.58 | .533 | 4.32 | .059 | 8.64 | .278 | 1.12 |
| 2-octyl | do | .252 | 3.45 | .219 | 1.74 | .104 | 5.29 | .942 | 2.44 | .082 | 6.22 | .302 | 1.03 |
| 1-methyl-allyl | do | .292 | 2.98 | .285 | 1.33 | .114 | 4.82 | .628 | 3.66 | .053 | 9.62 | .227 | 1.37 |
| i-Pr | do | .187 | 4.65 | .154 | 2.47 | .107 | 5.14 | .314 | 7.32 | .035 | 14.57 | .117 | 2.65 |
| 2-dodecyl | do | .317 | 2.74 | .258 | 1.47 | .235 | 2.34 | 2.040 | 1.13 | .270 | 1.89 | .430 | 0.72 |
| n-Bu | do | .166 | 5.24 | .206 | 1.84 | .091 | 6.04 | .314 | 7.32 | .039 | 13.08 | .194 | 1.60 |
| Et | do | .270 | 3.22 | .183 | 2.08 | .107 | 5.14 | .415 | 5.54 | .044 | 11.59 | .132 | 2.35 |
| t-Bu | do | .197 | 4.42 | .166 | 2.29 | .104 | 5.29 | .383 | 6.00 | .045 | 11.33 | .138 | 2.25 |
| n-octyl | do | .486 | 1.79 | .388 | 0.98 | .173 | 3.18 | 1.884 | 1.22 | .202 | 2.52 | .382 | 0.81 |
| s-Bu | n-Pr | .192 | 4.53 | .182 | 2.09 | .126 | 4.55 | .355 | 6.48 | .060 | 8.50 | .178 | 1.74 |
| s-Bu | i-Bu | .192 | 4.53 | .187 | 2.03 | .085 | 6.47 | .350 | 6.57 | .047 | 10.85 | .139 | 2.23 |
| n-Pr | Butyl carbityl | | | | | | | | | | | | |
| No synergist | | .870 | 1.00 | .380 | 1.00 | .550 | 1.00 | 2.30 | 1.00 | .510 | 1.00 | .310 | 1.00 |
| Piperonyl butoxide | | .073 | 11.92 | .245 | 1.55 | .133 | 4.14 | 1.15 | 2.00 | .165 | 3.09 | .310 | 1.00 |

NOTES:

HF = Houseflies.

SR = Synergistic ratio = $\dfrac{\text{LD50 insecticide alone}}{\text{LD50 insecticide + alkyl phosphonate}}$ GR = German roaches.

PREPARATION OF STARTING MATERIALS

The phosphonic dichlorides used as starting materials in the preparation of the alkyl phosphonates are prepared as follows:

A. n-Butylphosphonic dichloride

A mixture of diethyl n-butylphosphonate, 17 g. (0.088 mole) and phosphorous pentachloride, 36.6 g. (0.176 mole) is heated at 105°C. for 6 hours, and the phosphorous oxychloride is removed by distillation as it forms. The distillation is continued until no more phosphorous oxychloride forms. The residue is then distilled and 4.78 g. of n-butylphosphonic dichloride is collected, bp. 78°–80°C., 10 mm. The product has a refractive index of $n^{25}$ 1.4641.

B. n-Butylphosphonate n-Butyl bromide, 68.5 g. (0.5 mole) and triethylphosphite, 83.0 g. (0.5 mole) are mixed together without a solvent and the mixture is refluxed for several hours. The mixture is then distilled at 10 mm. and diethyl n-butylphosphonate, 17.0 g. is collected, having a bp. of 110°–111°C. The product has a refractive index of $n^{25}$ 1.4153.

The alkylphosphonates can also be prepared by reacting an alkyl phosphite such as diethyl phosphite, for example, with sodium in a dry solvent, and then with an alkyl halide such as n-octyl bromide, for example. The alkylphosphonate is collected by distillation under reduced pressure.

What is claimed:

1. A compound of the formula:

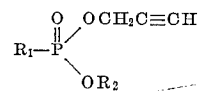

wherein $R_1$ is a straight or branched chain alkyl group having 2–12 carbon atoms and $R_2$ is propargyl, butyl carbityl or a lower alkyl group having 1–5 carbon atoms.

2. The compound of claim 1 wherein $R_1$ is n-propyl and $R_2$ is propargyl.

3. The compound of claim 1 wherein $R_1$ and $R_2$ are each n-propyl.

4. The compound of claim 1 wherein $R_1$ is sec-butyl and $R_2$ is propargyl.

5. The compound of claim 1 wherein $R_1$ is isopropyl and $R_2$ is propargyl.

6. The compound of claim 1 wherein $R_1$ is n-butyl and $R_2$ is propargyl.

7. The compound of claim 1 wherein $R_1$ is t-butyl and $R_2$ is propargyl.

8. The compound of claim 1 wherein $R_1$ is sec-butyl and $R_2$ is n-propyl.

9. The compound of claim 1 wherein $R_1$ is sec-butyl and $R_2$ is isobutyl.

\* \* \* \* \*